(12) United States Patent
O'Meara et al.

(10) Patent No.: US 9,245,272 B2
(45) Date of Patent: Jan. 26, 2016

(54) REVERSE BENEFITS DESIGNER (75) Inventors: Dave O'Meara, Reading (GB); Lynda Tollefson, Orlando, FL (US); Ashton Kawanishi, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 666 days.

(21) Appl. No.: 13/211,279

(22) Filed: Aug. 16, 2011

(65) Prior Publication Data

US 2013/0047107 A1 Feb. 21, 2013

(51) Int. Cl.
*G06F 3/048* (2013.01)
*G06Q 30/00* (2012.01)
*G06F 3/0486* (2013.01)

(52) U.S. Cl.
CPC .............. *G06Q 30/00* (2013.01); *G06F 3/0486* (2013.01)

(58) Field of Classification Search
USPC ......................................................... 715/769
See application file for complete search history.

(56) References Cited

U.S. PATENT DOCUMENTS

| | | | |
|---|---|---|---|
| 5,642,511 A * | 6/1997 | Chow et al. .................... 717/105 |
| 5,987,247 A * | 11/1999 | Lau ............................... 717/100 |
| 7,650,575 B2 * | 1/2010 | Cummins et al. ............. 715/769 |
| 8,126,937 B2 * | 2/2012 | Shaburov ....................... 707/805 |
| 8,296,332 B2 * | 10/2012 | Boley et al. .................... 707/803 |
| 2005/0172261 A1 * | 8/2005 | Yuknewicz et al. ........... 717/106 |
| 2008/0172628 A1 * | 7/2008 | Mehrotra et al. .............. 715/771 |
| 2008/0270444 A1 * | 10/2008 | Brodie .................. G06F 3/0482 |
| 2009/0276733 A1 * | 11/2009 | Manyam et al. ............... 715/854 |
| 2010/0162246 A1 * | 6/2010 | Tollefson et al. .............. 718/101 |
| 2011/0166880 A1 * | 7/2011 | Keynan et al. ..................... 705/2 |
| 2012/0330698 A2 * | 12/2012 | Gilliam ............................. 705/6 |

OTHER PUBLICATIONS

Inheritance, Apr. 30, 2011, http://web.archive.org/web/20110430061711/http://en.wikipedia.org/wiki/Hierarchy_(object-oriented_programming), pp. 1 and 5.*
Oracle "PeopleSoft Enterprise Benefits Administration 9.1 PeopleBook"; Nov. 2010; 254 pages.
Oracle "Human Resources Management Systems Implementation Guide"; Release 12.1; Jul. 2010; 646 pages.
Oracle "Managing Compensation and Benefits Using Oracle HRMS (US)"; Release 11I; Jan. 2000, 404 pages.

* cited by examiner

*Primary Examiner* — Jennifer To
*Assistant Examiner* — Sunil Sundar
(74) *Attorney, Agent, or Firm* — Trellis IP Law Group, PC (57) ABSTRACT

In a method, system, and computer-readable medium having instructions for a reverse benefits designer, one or more objects available for creating a plan design framework are displayed in a graphical user interface, an indication of an object from the one or more objects selected for placement in a hierarchy of the plan design framework depicted on the graphical user interface is received, and data is stored in a repository for the plan design framework in accordance with the object placement.

18 Claims, 6 Drawing Sheets

REVERSE BENEFITS DESIGNER

BACKGROUND

Approaches to setting up software may include the provision of a series of textual input forms and each form may query a user for data required for executing the software. Although documentation may be provided to explain and provide instruction on the setup of benefits plan software, effective setup with the forms generally requires knowledge of the architecture of the system and is not intuitive to persons that are untrained in setting up the software.

Setting up software for managing a benefits plan of a business entity often requires employing a trained consultant due to the complexity involved in setting up the system. Typically, a benefits plan administrator provides the details of a benefits plan to a trained consultant and the consultant sets up the system in accordance with the benefits plan desired by the benefits plan administrator. The administrator may have already decided how many programs and plans to offer, what the options are, how much they will cost the employer and employee, who is eligible and any actions that the employee must take. The problem is that they need to translate these end results into setup steps that require them to understand both the architecture of the Benefits product and the precise setup steps required. This is normally achieved by separately documenting the program and plan details, which is then handed off to be interpreted by a consultant and implemented by going through the functional setup screens.

Such an approach may be costly due to the necessity of hiring a consultant to change and/or setup benefits plan software as well as inefficient because a benefits plan administrator has the knowledge for the benefits plan and must explain and document the desired plan for a consultant before the system can be set up. Accordingly, it is desirable to provide an efficient and intuitive technique for setting up benefits plan software.

SUMMARY

In a method, system, and computer-readable medium having instructions for a reverse benefits designer, one or more objects available for creating a plan design framework are displayed in a graphical user interface, an indication of an object from the one or more objects selected for placement in a hierarchy of the plan design framework depicted on the graphical user interface is received, and data is stored in a repository for the plan design framework in accordance with the object placement.

A further understanding of the nature and the advantages of particular embodiments disclosed herein may be realized by reference of the remaining portions of the specification and the attached drawings.

DETAILED DESCRIPTION OF EMBODIMENTS

Systems, methods, apparatuses, computer readable mediums, and computer program products are provided for a reverse benefits designer. Embodiments may provide a graphical user interface (GUI) for designing a benefits plan design framework and/or setting up a benefits software application with the benefits plan design framework created with the GUI. A benefits plan design may involve any decisions regarding set up of programs or free-standing benefit plans, such as health care, retirement, vacation, general welfare, life insurance, dental, and/or any other benefits provided by an entity. In an embodiment, the benefit plan design is created for one or more employee(s) and/or prospective employee(s) with the GUI by an administrator for a business entity.

The administrator or user may have any level of training with a particular type of software application for creation of the benefits plan design framework using a reverse benefits designer. It may be desirable to provide a graphical user interface such that any person could design a framework for a benefits plan design. For example, persons that are not specially trained in setting up a particular software application (e.g. not a consultant for a software application) can create the framework for a benefits plan design that can be used to setup the benefits software application. In an embodiment, setup of a software application using a reverse benefit designer may involve accessing, reading, writing, creating, altering, deleting, and/or manipulating the data in one or more database tables that are used as the underlying data in execution of a benefits plan software application.

In one or more embodiments, a hierarchy is created within a benefits plan design framework created using the GUI. A hierarchy is an arrangement of objects in which the objects are represented as above, below, at the same level, and/or have any other type of relationship between objects. Attributes can be assigned and inherited by objects of a benefits plan design framework in accordance with a hierarchy in the benefits plan design framework created by the user with the GUI.

Figure 1:
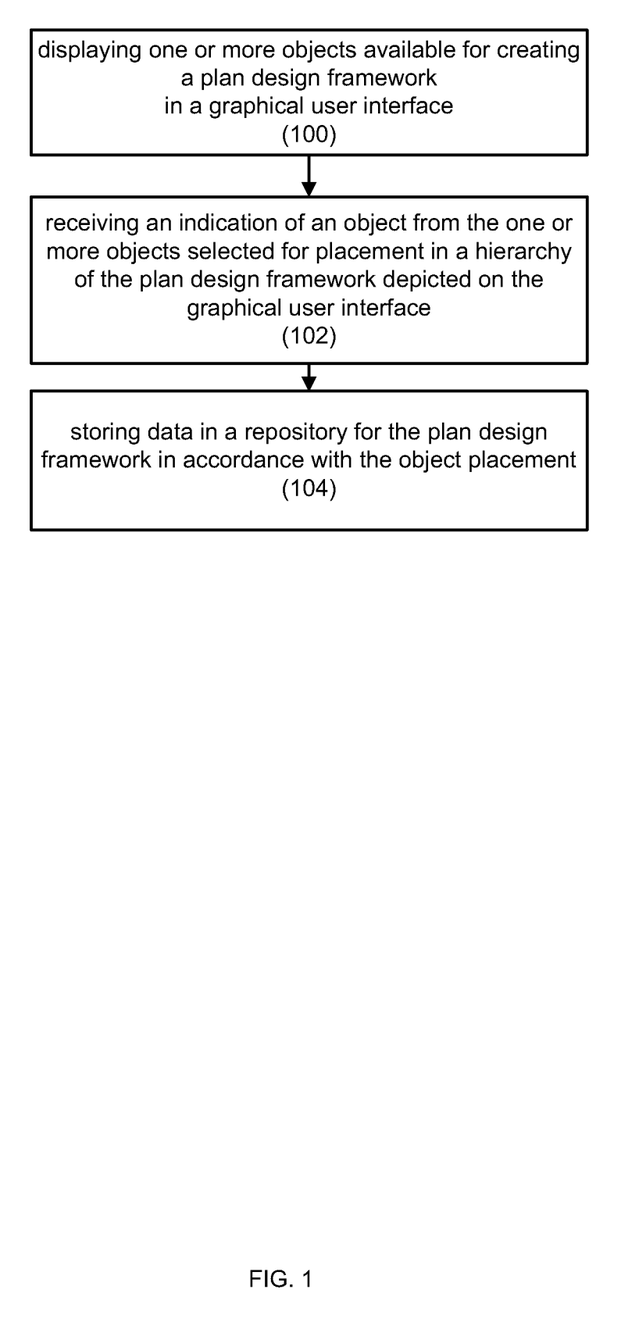
FIG. 1 illustrates a flow chart with an example of an implementation of a reverse benefits designer.

Although the description has been described with respect to particular embodiments thereof, these particular embodiments are merely illustrative, and not restrictive. FIG. 1 illustrates a flow chart with an example of an implementation of a reverse benefits designer. One or more objects available for creating a plan design framework may be displayed in a graphical user interface (100). In one or more embodiments, the plan design framework may be for a benefits plan design. In another embodiment, the plan design framework may be for a compensation plan design that for handling the allocation of compensation to employees, including but not limited to, bonus plans, stock option plans, paid-time off distribution, and/or any other type of compensation. The one or more objects may be widgets, tools, and/or any other element that the user can interact with on the graphical user interface. A widget is an element that the user interacts with on the user interface and the element is adapted to facilitate manipulating, interacting with, and/or viewing a particular collection of or type of data. The widget may be thought of as a control for the user in the GUI and the widget may provide an interaction point for the manipulation of a collection of data or a particular kind of data.

In an embodiment, the widget is a visual building block in the GUI that represents data processed by and/or stored for a software application and the available interactions on this data. For example, the widget may be an icon. An icon is an element on the GUI that represents a file, a program, a command, a collection of data, a document, one or more database table(s), or any combination thereof.

The palette is a window or visual area displayed on the user interface with the one or more objects that are available to build the framework on the canvas. The canvas is a window on the user interface that displays a framework for the benefits plan design. The benefits plan design framework is represented by the objects selected by the user and placed onto the canvas window. Upon selection and/or placement of an available object by the user, the user may be prompted with further instructions or information and/or asked to enter more data for the object.

Validation may be performed to ensure that the object placement in the framework is consistent with a set of rules for each object. A library of objects may be provided for the user interface with a set of rules that are specific to a particular type of benefits plan software. The validation may ensure that the user is creating a benefits plan design framework that allows for set up of a particular software application.

A determination may be made as to which objects are available to the user to place on the canvas. The objects available to the user may change over time based upon the state of the existing benefits framework that the user has built. For example, if the user does not have an existing benefits framework, then the user may be presented with the various objects that are available to a user to begin building a framework for a benefits software application.

In an embodiment, the one or more objects displayed as available for the user may reflect the dependencies that exist between the database tables of a repository that are used as the underlying data for execution of a benefits plan software application. Each object may represent the data that is stored in the database for a benefits plan software application. A dependency may exist between objects such that certain objects may need created and stored before other objects are created within the benefits plan design framework. For example, in the creation of the Plan object, the underlying data for the benefits Plan Type object may need to be created and stored in the database prior to the creation of the Plan object.

An indication may be received that an object from the one or more objects is selected for placement in a hierarchy depicted on the user interface (102). The user may indicate that an object should be placed in a particular place in the benefits framework depicted on the user interface by dragging and dropping an object onto the canvas and placing the object in a particular position in relation to other objects.

A hierarchy is an arrangement of objects in which the objects are represented as above, below, at the same level, parent-child relationships, sibling relationships, and/or have any other type of relationship between objects. The benefits plan design framework may have any number of hierarchies depicted in the user interface and the placement of an object within a hierarchy of the framework may indicate that particular attributes may be assigned to the object. For example, a parent-child relationship may exist between objects and the placement of an object in a child relationship may allow for the child to inherit the attributes of the parent object. In another embodiment, an object may inherit the attributes of all relations considered to be above the object in the hierarchy of the benefits plan design framework.

Data may be stored in a repository for the plan design framework in accordance with the object placement (104). A repository may be a relational database, an object oriented database, a file system, or any other collection of data. In an embodiment, a database management system or server may be used to create access, maintain, and/or manipulate data for a database. One or more database tables may be populated in a repository in accordance with the object placement in the benefits plan design framework.

The object placement within a hierarchy of the benefits framework may indicate the attributes assigned to the object and the data that may be stored in a repository for the object. For example, the attributes assigned directly to the object may be stored for the particular object as well as the attributes inherited by the object from related objects as defined by the hierarchy created by the user.

In an embodiment, the setup of a benefits software application using setup forms may involve a bottom up approach with the creation or storage of data for particular building block components of a benefits plan design framework before the user can create the actual framework for a benefits plan design with the components or objects. For example, an eligibility profile may need to be defined and saved to the database before any data for a benefits program of a business entity can be saved to the database. Continuing with the example, an administrator may want to ensure that a participant can only enroll in the K-Georgia PLAN if they actually reside in the state of Georgia. A Benefits Administrator may only know that they want to 'associate a Georgia-zip code-ONLY' eligibility to the Plan. The Benefits Administrator may not necessarily know the intricacies of setting up an Eligibility profile, such as the steps of a) saving all the Georgia zip codes on a particular set-up form, followed by b) creating a grouped service area named Georgia, etc. In other words, there are at least three steps that may need to be performed to attach a Georgia Eligibility Profile to a K-Georgia Plan. It may be desirable to walk the user through these steps, so that they can actually start top-down, by attempting to "attach an Eligibility Profile" by dragging & dropping an Eligibility Profile object next to the K-Georgia plan and in an embodiment, a sequence of text inputs may pop up, asking them to a) Name the Profile, b) Start listing the zip codes, etc. Such an approach may not be intuitive to a user unfamiliar with the architecture of the benefits plan software and knowledge of the particular building block components that may need to exist in order to move forward with creation of the framework.

In another embodiment, a user may want to create a Life Insurance plan with different premium amount cost for each participant based upon their age. For example, with the age bracket of 50-59, a participant may pay $4.00 per pay period. Continuing with the example, with an age bracket of 40-49, a participant may pay $3.00 per pay period. To create the components for such a desired plan to support an embodiment of benefits software, a user may perform the following steps, 1) create a Derived Factor component, on the Age form, for each of the brackets, (e.g. 30-40, and 40-50), and 2) create two Eligibility Profile components (e.g. the first Eligibility Profile component (e.g. named 30-40) may use the 30-40-Derived Factor component, and the second Eligibility Profile component (e.g. named 40-50) may use the second Derived Factor component). Next, these Eligibility Profile components may be attached or associated with a Plan. Alternatively, the components may be associated with a Rates component, to specify different eligibility options, or costs, based upon each participant's actual age, at the time of evaluation. The available options for creating components to support the benefits software may not be intuitive to the user and the benefits plan design framework may provide the ability to walk the user through the available options to achieve the same resulting plan design.

In one or more embodiments, the reverse benefits designer user interface may hide the details of the setup process that are not intuitive to an administrator by presenting the setup process to the user as a top down approach within the user interface. For example, the user may be able to build a framework with any object desired regardless of the ordering of the components or objects creation necessary for the setup of the software. In an embodiment, the user can create a benefits plan design framework without knowledge of the required components or objects that must exist for the software and the reverse benefit designer user interface may guide the user through the creation of the individual components of a framework (e.g. underlying data in the database) as needed.

Figure 2:
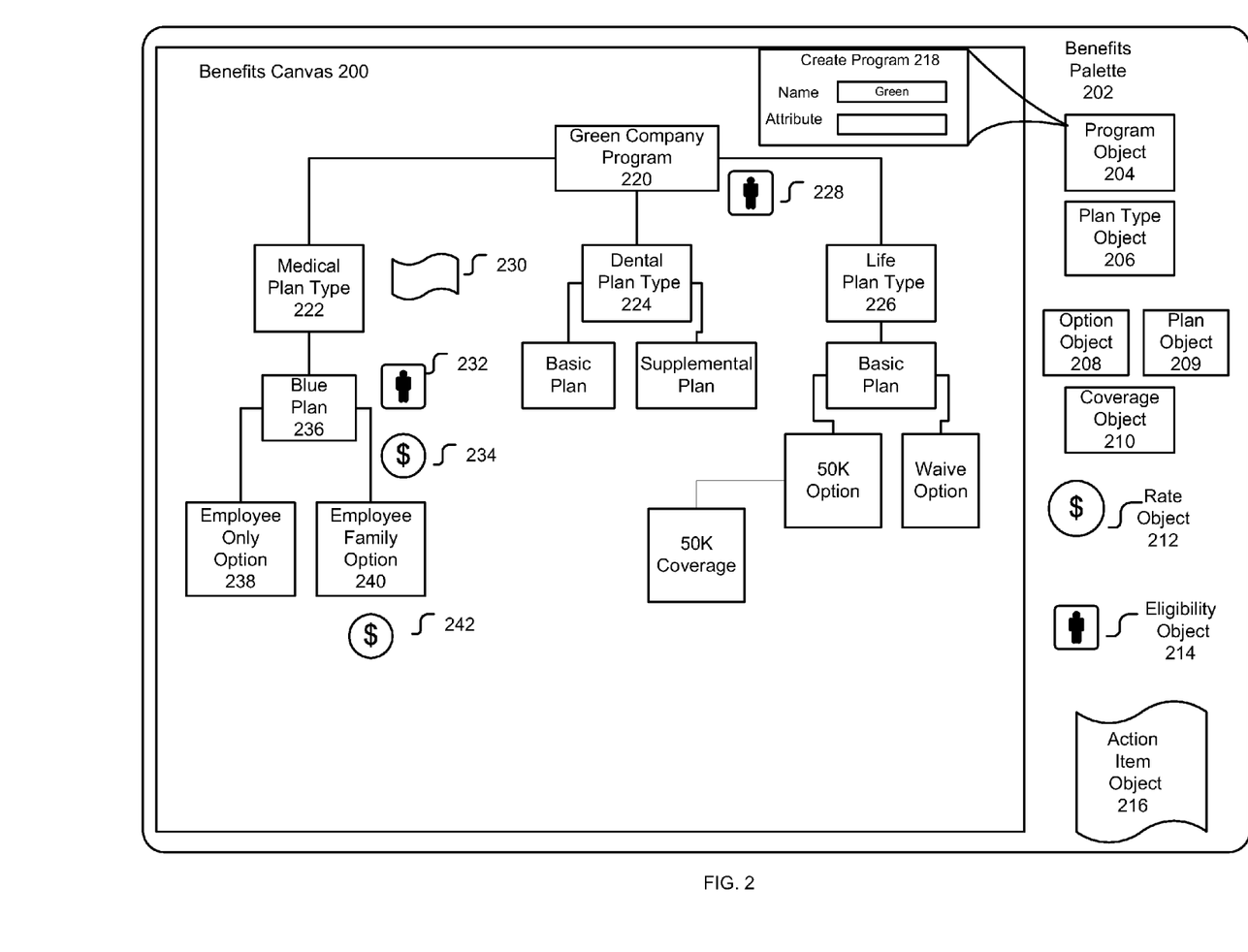
FIG. 2 illustrates a block diagram with an example of a user interface for an implementation of a reverse benefits designer.

FIG. 2 illustrates a block diagram with an example of a user interface for an implementation of a reverse benefits designer. The reverse benefits designer user interface has a Benefits Canvas 200 window for creation of a benefits plan design framework and Benefits Palette 202 window with objects available to the user for creation of the benefits plan design framework. In an embodiment of the user interface, the Benefits Palette 202 has the following objects available to the user for creation of the benefits plan design framework: a Program Object 204, Plan Type Object 206, Option Object 208, Plan Object 209, Coverage Object 210, Rate Object 212, Eligibility Object 214, and Action Item Object 216.

When the user selects an object (e.g. drags and drops objects) from the Benefits Palette 202 onto the Benefits Canvas 202, the user may be prompted to enter in data and/or given further instruction on the creation of the benefits plan design framework. As shown in FIG. 2, when a Program Object 204 is dragged and dropped onto the Benefits Canvas 202, the user may be prompted as depicted with Create Program 218 prompt to enter a program name data and an attribute data.

The user can create a benefit plan design framework with one or more hierarchies and hierarchical relationships between the objects. For example, the benefit design plan framework depicted in FIG. 2 has a Green Company Program 220 object with hierarchical relationships between the objects. Continuing with the example, the Green Company Program 220 object has a hierarchy as depicted with Plan Type objects (e.g. Medical Plan Type 222, Dental Plan Type 224 and Life Plan Type 226), Plan objects under the Plan Type objects (e.g. Blue Plan 236, etc.), and Option objects under the Plan objects (e.g. Employee Only Option 238, etc.).

In another example, a hierarchy may exist indicating the strength of the eligibility profiles and the positioning of the Eligibility Objects may indicate the eligibility requirements inherited between objects. Continuing with the example, the Medical Plan Type 222 object and objects under the Medical Plan Type 222 object, Dental Plan Type 224 object and objects under the Dental Plan Type 224 object, and Life Plan Type 226 object and objects under the Life Plan Type 226 object may inherit the attributes for the Eligibility Object 228 depicted in FIG. 2 that is assigned to the Green Company Program 220 object. The Eligibility Object 228 may provide the attributes for eligibility for all benefits plans for the Green Company Program 220. The Action Item Object 230 assigned to the Medical Plan Type 222 object indicates that the attributes for the Action Item Object 230 may be assigned to all objects under the Medical Plan Type 222 object. By way of example, the Action Item Object 230 may have attributes for a life event that may allow for a change in a medical plan, such as a birth of a child, age of an employee, or any other life event.

The user of the reverse benefit designer user interface is building a framework as well as creating hierarchies that allow the user to assign attributes through inheritance. An object placement into the framework on the user interface may override and/or supplement the attributes for related objects in accordance with the hierarchy of the framework. The hierarchical relationships between objects determine the attributes that are inherited between objects. For example, the Eligibility Object 232 and Rate Object 234 associated with the Blue Plan 236 may add attributes to the Blue Plan 236 as well as the objects under the Blue Plan 236, the Employee Only Option 238 object and the Employee Family Option 240 object. Continuing with the example, Eligibility Object 232 may add and/or override attributes inherited from the Eligibility Object 228 associated with the Green Company Object 228. Similarly, the association of the Rate Object 242 with the Employee Family Option 240 object allows the user to supplement and/or override attributes assigned with the Rate Object 234.

Although FIG. 2 depicts objects associated with other objects, such as Plan Type Objects 206 that are associated with Program Object 204, those with skill in the art will recognize that an object may be a free-standing object. For example, a plan type (e.g. an instance of a Plan Type Object 206) may exist without an associated Program Type Object 204. Continuing with the example, a plan type for a 401K benefit may exist or be instantiated in the framework as free-standing (e.g. without association to another parent object of a Program Type).

Figure 3:
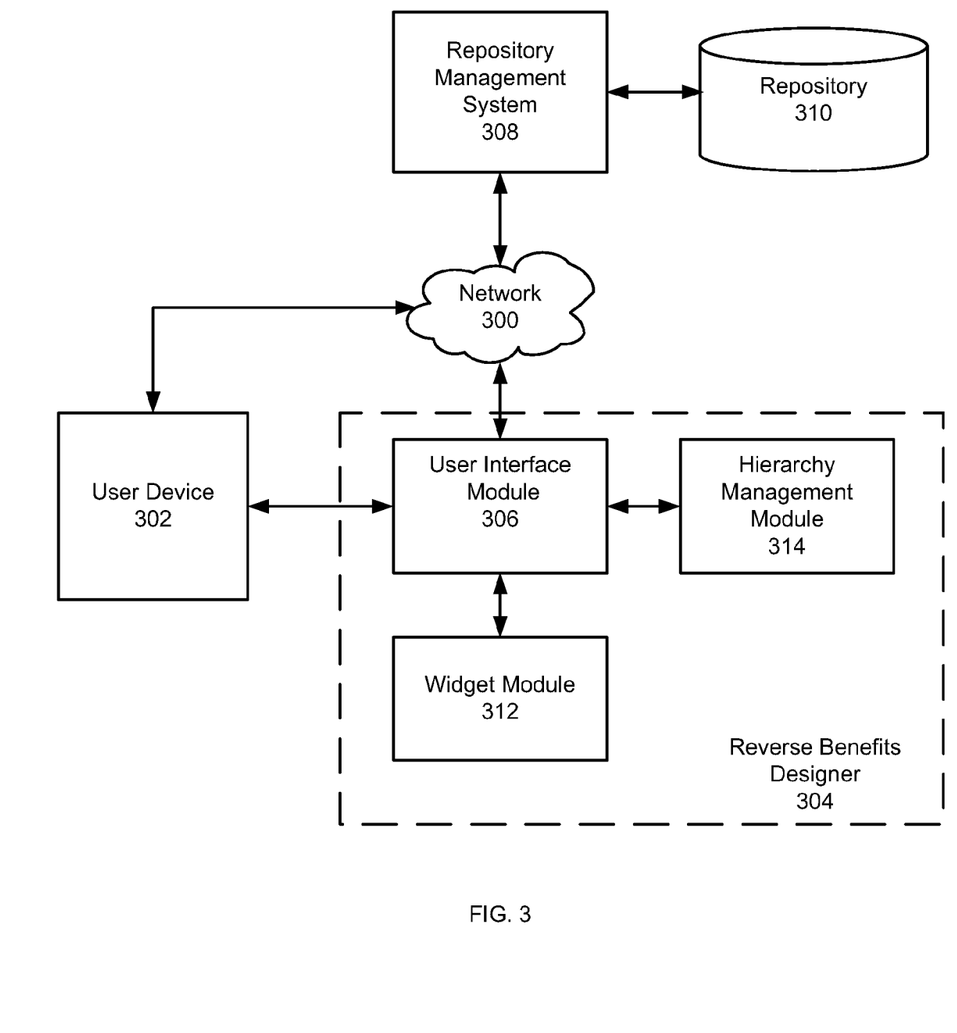
FIG. 3 illustrates a block diagram for an implementation of a reverse benefits designer.

FIG. 3 illustrates a block diagram for an implementation of a reverse benefits designer. A Network 300 is an infrastructure for sending and receiving signals and messages according to one or more designated formats, standards, or protocols. The Network 300 is a collection of computer systems and/or devices that are interconnected by communications channels that facilitate communications and allows for sharing of resources and information among interconnected devices. The Network 300 may provide for both wired and wireless communication between the various elements of FIG. 3. Embodiments may rely on a Network 300 for communication between elements of an implementation of a reverse benefits designer as depicted, including, but not limited to, the following: a User Device 302, a Reverse Benefit Designer 304, a User Interface Module 306, and a Repository Management System 308.

The Repository Management System 308 is software that controls the creation, maintenance, and use of a Repository 310. A Repository 310 may be any collection of data, such as a relational database, an object-oriented database, a cache, and/or a file system. In an embodiment, the Repository Management System 308 may be a database server. The Repository 310 may store the data for any benefits plan design framework created using the Reverse Benefit Designer 304. The data for the benefits plan design framework stored in the Repository 310 may be used as a framework for benefits plan software with additional data input to the Repository 310 to execute the software and/or the data stored for the framework may be a sufficient data to execute the benefits plan software.

The benefits plan design framework may be created by the user with the user interface generated using the User Interface Module 306 of the Reverse Benefit Designer 304. The Widget Module 312 may be used by the User Interface Module 306 to create the widgets on the user interface, including but not limited to the windows, prompts, icons, objects, canvas window, palette window, and any other element used for the user interface. The User Interface Module 306 may use a Hierarchy Module 314 to keep track of and manage the hierarchies in the benefits framework, such as the hierarchical relationships and assignment of attributes to the objects. For example, the Hierarchy Module may be used for identification of the underlying data that may be stored for the objects in accordance with the placement of the object in a hierarchy within the framework.

The user interface may be displayed on the User Device 302. The User Device 302 may be one or more computer systems or devices. For example, the User Device 302 may include portable music players, personal computers, laptop computers, cellular phones, set-top boxes, televisions, or any other device. In an embodiment, the user interface may be a web page served to the User Device 302 by a web server utilizing client-server architecture. In another embodiment, the reverse benefit designer may be a software application installed on a stand-alone computer system. Although an implementation of a reverse benefit designer is depicted and described with various elements and architectures, those with skill in the art will recognize that various architectures and any number of elements may be employed to create a reverse benefit designer.

Figure 4:
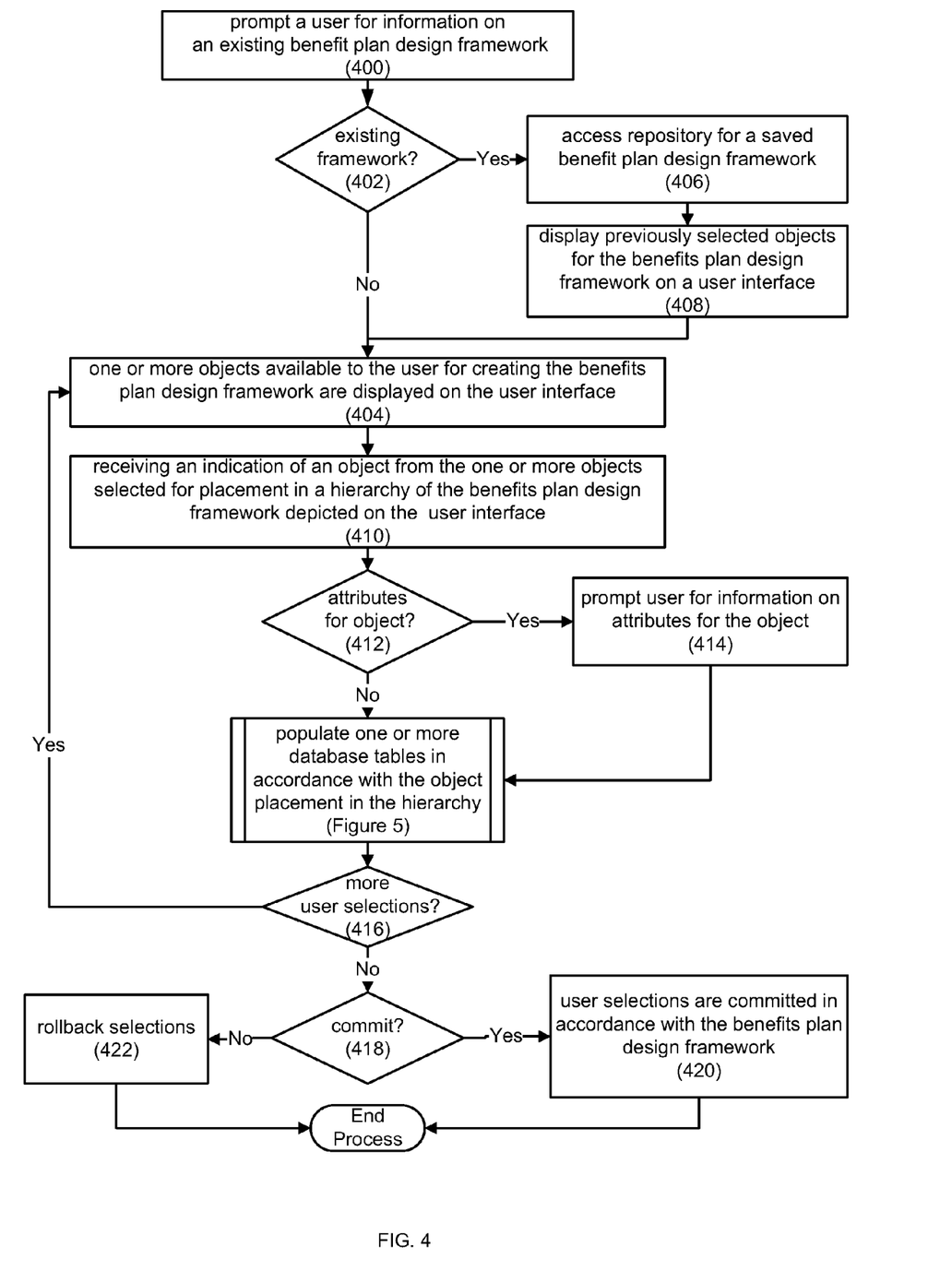
FIG. 4 illustrates a flow chart for an implementation of a reverse benefits designer.

FIG. 4 illustrates a flow chart for an implementation of a reverse benefits designer. A user may be prompted for information on an existing employee benefit plan design framework (400). In an embodiment, an input window (e.g. text input) or any other type of widget may be provided by the user interface to prompt the user for a benefit plan design framework name and/or any other identifier for identification of an existing benefit plan design framework. A determination may be made as to whether a framework exists (402). If a framework does not exist, then one or more objects available to the user for creating the benefits plan design framework are displayed on the user interface (404).

Alternatively, if a framework exists (402), then the repository may be accessed for a saved framework (406) and the selected objects of the benefits plan design framework may be displayed on the user interface (408).

One or more objects available to the user may be displayed on the user interface for creation of the benefits plan design framework (402). A determination may be made based upon the current framework that the user has created which objects are available to the user. For example, if the user does not have an existing benefits plan design framework, then particular objects may be available on a palette window on the user interface. In another example, the existing benefits plan design framework may dictate which objects the user may desire in order to complete the benefits plan design framework. In an embodiment, an indication, such as particular shading and/or coloring on the objects in the user interface, may inform the user which objects are available and/or unavailable.

An indication may be received of an object from the one or more objects as selected for placement in a hierarchy of the benefits plan design framework depicted on the user interface (410). In an embodiment, the indication may be in the form of dragging and dropping an object onto the canvas window of the user interface. The placement of the objects within the framework depicted on the user interface may be ordered by the user and define hierarchical relationships between the objects, such that the user may be creating a benefits plan design framework with a hierarchy using the user interface.

A determination may be made as to whether the user is to be prompted for attributes for the object (412). If there are no further attributes for the user to enter for the object, then one or more database tables may be populated in accordance with the object placement in the hierarchy of the benefits plan design framework, as will be described in further detail with FIG. 5.

Alternatively, if more information for the attributes of an object is needed, then the user is prompted to provide more information for the attributes of the object (414). A text box window may be provided for the user to enter more information for the attributes that apply to the object. One or more database tables may be populated in accordance with the object placement in the hierarchy of the benefits plan design framework, as will be described in further detail with FIG. 5.

If a user wants to make more selections (416), then the process continues (404). Alternatively, if the user is done with selections for the benefits plan design framework (416), then the user may be prompted as to whether the user desires to commit the changes to the database (418).

If the user wants to commit the selections (418), then the user selections are committed in accordance with the benefit plan design framework (420) created by the user and the process ends. Alternatively, if the user desires to rollback the changes (418), then the database changes are rolled back (422).

Figure 5:
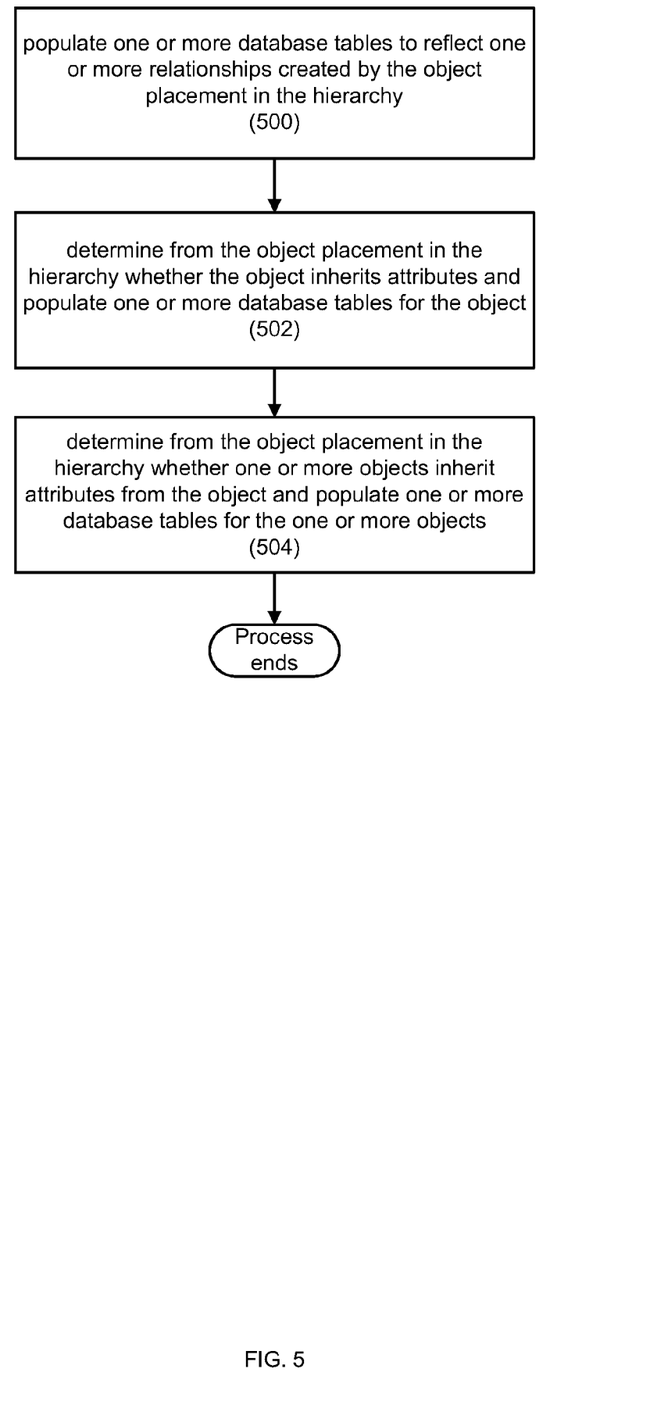
FIG. 5 illustrates a flow chart for an implementation of a reverse benefits designer.

FIG. 5 illustrates a flow chart for an implementation of a reverse benefits designer. One or more database tables may be populated to reflect one or more relationships created by the object placement in the hierarchy (500). Object relationships including, but not limited to, the following: child-parent relationships, sibling relationships, and/or any other type of relationship between objects. In an embodiment, a database table of the relationships may be maintained and the table may be updated to reflect one or more relationships created by the placement of the object in the hierarchy of the framework.

The attributes that the object inherits may be determined from that object placement in the hierarchy of the benefits plan design framework (502). For example, if an object is placed in a position of the hierarchy such that the object is child of another object, then the object may inherit attributes from the parent object. Continuing with the example, a medical plan type object (e.g. element 222 of FIG. 2) may inherit the attributes and/or associated objects (e.g. eligibility object as depicted with 228 of FIG. 2) from a program type object (e.g. element 220 of FIG. 2). The attributes of the related object and/or associated objects of a parent object may be applied and/or inherited by an object in the hierarchy. A database table may store the attributes and the associated objects that each object inherits. In another embodiment, the relationships may be stored in a database table and the attributes for an object inherited from parent objects and/or any other associated objects may be determined from accessing one or more database tables.

The attributes that one or more objects inherit from the object placement in the hierarchy may be determined and stored in one or more database tables (504). Attributes of associated objects of the object placed in the hierarchy may be inherited by other objects and the relationships and/or data from the attributes may be stored in the database. Next, the process for storage of information from the placement of the object in a hierarchy of the benefit plan design framework may end.

Figure 6:
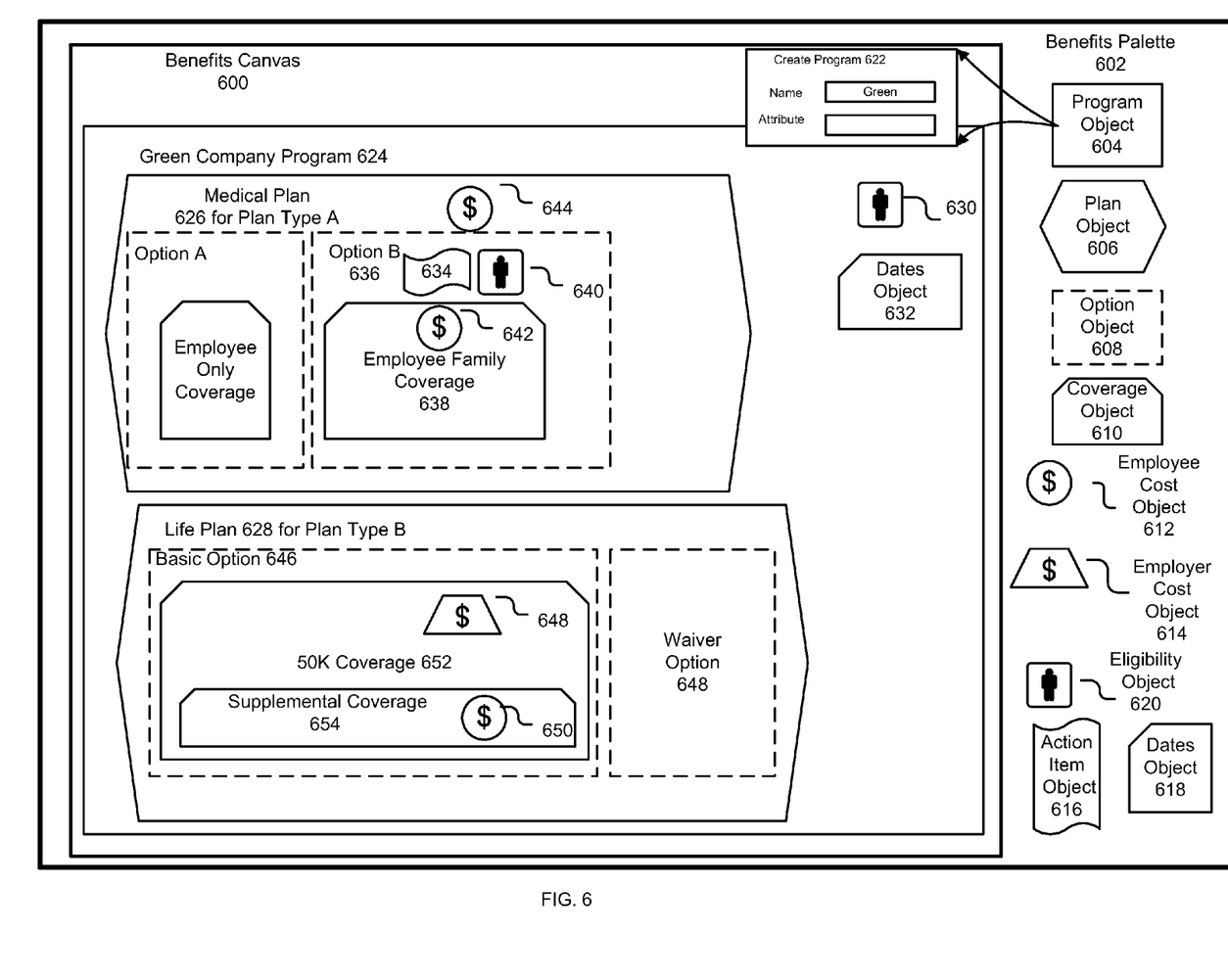
FIG. 6 illustrates a block diagram with an example of a user interface for an implementation of a reverse benefits designer.

FIG. 6 illustrates a block diagram with an example of a user interface for an implementation of a reverse benefits designer. The reverse benefits designer user interface may have a Benefits Canvas 600 window for creation of a benefits plan design framework and Benefits Palette 602 window with objects available to the user for creation of the benefits plan design framework. In an embodiment of the user interface, the Benefits Palette 602 has the following objects available to the user for creation of the benefits plan design framework: a Program Object 604, Plan Object 606, Option Object 608, Coverage Object 610, Employee Cost Object 612, Employer Cost Object 614, Eligibility Object 620, Action Item Object 616, and Dates Object 618.

When the user selects an object (e.g. drags and drops objects) from the Benefits Palette 602 onto the Benefits Canvas 602, the user may be prompted to enter in data and/or given further instruction on the creation of the benefits plan design framework. As shown in FIG. 6, when a Program Object 604 is dragged and dropped onto the Benefits Canvas 602, the user may be prompted as depicted with Create Program 622 prompt to enter a program name data and an attribute data.

The user can create a benefit plan design framework with one or more hierarchies and hierarchical relationships between the objects. For example, the benefit plan design framework plan depicted in FIG. 6 has a Green Company Program 624 object with hierarchical relationships between the objects. The Medical Plan 626 object and objects inside the Medical Plan 626 object, and the Life Plan 628 object and objects inside the Life Plan 628 object may inherit the attributes for the Eligibility Object 630 and Dates Object 632 depicted in FIG. 6 that is assigned to and/or associated with the Green Company Program 624 object. Although not illustrated with shapes in the example GUI depicted in FIG. 6, those with skill in the art will recognize that the Medical Plan 626 and Life Plan 628 object may be associated with Plan Type objects (e.g. Medical Plan 626 associated with Plan Type A and Life Plan 628 associated with Plan Type B) that also may be depicted with shapes within the GUI.

The Eligibility Object 630 may provide the attributes for eligibility requirements for all benefits plans for the Green Company Program 624. The Dates Object 632 may define the attributes for when an employee can alter and/or supplement their benefits plan design. The user may be prompted for entry of the attributes associated with each object. In an embodiment the user may indicate whether the attribute of an object can be inherited by the other objects and/or whether the attribute is private to related objects.

The Action Item Object 634 assigned to and/or associated with "Option B" 636 object of the Medical Plan 626 object indicates that the attributes for the Action Item Object 634 may be assigned to all objects within the Medical Plan 626 "Option B" 636 object. By way of example, the Action Item Object 626 may have attributes for a life event that may allow for a change in a medical plan, such as a birth of a child, age of an employee, and/or any other life event. The Action Item Object 626 may indicate that a life event, such as the birth of a child, would allow the user the option to change to the Employee Family Coverage 638.

The user of the reverse benefit designer user interface is building a framework as well as creating hierarchies that allow the user to assign attributes through inheritance. An object placement into the framework in relation to other objects placed on the user interface may allow for overriding and/or supplementing the attributes for related objects in accordance with the hierarchy of the framework. The hierarchical relationships between objects determine the attributes that are inherited between objects.

In this example interface, the objects inside of another object may be viewed as a child object inheriting from the parent object that surrounds the child object. In an embodiment, an object associated with a parent object may define attributes by being associated with the parent if the associated objects are likewise within the parent object and outside of a child object. For example, the Eligibility Object 640 associated with the Option B 636 may add attributes to the Option B 636 as well as the objects inside the Option B 636, such as the Employee Family Coverage 638 object (e.g. a child object). The association of the Employee Cost Object 642 with the Employee Family Coverage 638 object allows the user to supplement and/or override attributes assigned with the Employee Cost Object 640 associated with the Medical Plan 626 object.

The Life Plan 626 object may have a Basic Option 646 object and a Waiver Option 648 object associated with the Life Plan 626. The Basic Option 646 may have an Employer Cost 648 object that defines the employer cost for the Basic Option 646 50 K Coverage 652 object. The user may define supplemental costs for the Supplemental Coverage 654 object with additional Employee Cost 650 object.

Validation may be performed as the user is building the benefits framework and defining one or more hierarchies with the benefits framework. For example, if a user does not provide an object (e.g. an eligibility object) or particular attributes that are required to be stored in order to execute the benefits plan software, then validation of the benefits framework may be performed to locate such an issue. Prompts may be displayed to provide the user with guidance for building the benefit plan design framework. For example, when an administrator first opens the user interface, the user may move a program or a plan in the panel to create a framework and the rest of the icons may be shaded and immovable. Continuing with the example, if the user chooses a program, then a prompt may be displayed to request what dates the program will be available for.

In another example, if the user first drops in a plan without having created a program first, a prompt can be displayed and/or rendered to ask the user whether they intend to have a free-standing plan, or whether the plan will reside within a program. Validation may be performed and a prompt may be displayed to suggest the creation a program first. Validation may be performed to prompt the user with a suggestion for the creation of a Plan Type before creation of a Plan. In an embodiment, a Plan Type object may need to be created before the creation of a Plan object. If a program has been placed on the canvas, the program may be grayed out or shaded and not selectable in an embodiment. If the user tries to do something that is not logical (e.g. drop an option into the program) and/or not consistent with the rules for the benefits plan software, the user interface may prevent the user from pursuing an object placement and/or guide the user to the available options.

In one or more embodiments, a library of objects may be used and each object in the library may have a set of rules defining possible hierarchical relationships that are permitted between objects in the library. In another example, if a user attempts to place an object in a position in relation to other objects that is not permitted by one or more rules for the objects, then validation may be performed to locate placement errors and prompts may be displayed to provide the user with guidance for placement of objects in accordance with the rules.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method, performed by one or more processors, for a reverse benefits designer, the method comprising:
displaying one or more plan designing objects available to a user for creating a benefits plan design framework, with the one or more plan designing objects displayed in a palette portion of a graphical user interface;
placing, in response to user input, selected plan designing objects in selected positions on a canvas portion of the graphical user interface to create the benefits plan design framework, with placement of plan designing objects determining a multi-level hierarchical relationship between plan designing objects moved to the canvas portion of the graphical user interface;
placing, in response to user input, an eligibility object at one level of the multi-level hierarchical relationship, with the eligibility object defining attributes requirements of at least one benefits plan and with the attributes inherited by all plan designing objects at the same or lower levels in the multi-level hierarchical relationship;
populating one or more database tables stored in a repository in accordance with placement of plan designing objects on the canvas portion of the graphical user interface and in accordance with inherited attributes;
maintaining and updating a relationship table reflecting the relationship between the plan designing objects placed on the canvas portion of the graphical user interface;
prompting the user for information on attributes of a plan designing object populating the one or more database tables if more information on attributes of a plan designing object is needed; and
performing validation on plan designing objects selected for the benefits plan design framework using a set of rules for plan designing objects.

2. The method of claim 1, further comprising: determining from plan designing object placement in a hierarchy whether the plan designing object inherits attributes from one or more related plan designing objects; and storing data in the repository for the plan designing object to capture one or more inherited attributes for the plan designing object.

3. The method of claim 1, further comprising: determining from plan designing object placement in a hierarchy whether one or more related plan designing objects inherit attributes from the plan designing object; and storing data in the repository for one or more inherited attributes for the one or more plan designing objects.

4. The method of claim 1, wherein the data stored in a repository for the benefits plan design framework is used for execution of a benefits plan software application.

5. The method of claim 1, wherein user input comprises dragging and dropping an icon for a plan designing object from the palette portion to the canvas portion of the graphical user interface.

6. The method of claim 1, further comprising: receiving information for the plan design framework previously saved for a user; and determining the one or more plan designing objects available for creating the plan design framework for the user based upon the information.

7. A non-transitory computer readable storage medium having one or more instructions thereon for a reverse benefits designer, the instructions when executed by one or more processors causing the one or more processors to carry out:
displaying one or more plan designing objects available to a user for creating a benefits plan design framework, with the one or more plan designing objects displayed in a palette portion of a graphical user interface;
placing, in response to user input, selected plan designing objects in selected positions on a canvas portion of the graphical user interface to create the benefits plan design framework, with placement of plan designing objects determining a multi-level hierarchical relationship between plan designing objects moved to the canvas portion of the graphical user interface;
placing, in response to user input, an eligibility object at one level of the multi-level hierarchical relationship, with the eligibility object defining attributes requirements of at least one benefits plan and with the attributes inherited by all plan designing objects at the same or lower levels in the multi-level hierarchical relationship;
populating one or more database tables stored in a repository in accordance with placement of plan designing objects on the canvas portion of the graphical user interface and in accordance with inherited attributes;
maintaining and updating a relationship table reflecting the relationship between the plan designing objects placed on the canvas portion of the graphical user interface;
prompting the user for information on attributes of a plan designing object populating the one or more database tables if more information on attributes of a plan designing object is needed; and performing validation on plan designing objects selected for the benefits plan design framework using a set of rules for plan designing objects.

8. The non-transitory computer readable storage medium of claim 7, the instructions when executed by one or more processors causing the one or more processors to further carry out:

determining from plan designing object placement in the hierarchy whether the plan designing object inherits attributes from one or more related plan designing objects; and storing data in a repository for the plan designing object to capture one or more inherited attributes for the plan designing object.

9. The non-transitory computer readable storage medium of claim 7, the instructions when executed by one or more processors causing the one or more processors to further carry out:

determining from plan designing object placement in a hierarchy whether one or more related plan designing objects inherit attributes from the plan designing object; and storing data in the repository for one or more inherited attributes for the one or more plan designing objects.

10. The non-transitory computer readable storage medium of claim 7, wherein the data stored in a repository for the benefits plan design framework is used for execution of a benefits plan software application.

11. The non-transitory computer readable storage medium of claim 7, wherein user input comprises dragging and dropping an icon for an plan designing object from the palette portion to the canvas portion of the graphical user interface.

12. The non-transitory computer readable storage medium of claim 7, the instructions when executed by one or more processors causing the one or more processors to further carry out:

receiving information for the plan design framework previously saved for a user; and determining the one or more plan designing objects available for creating the plan design framework for the user based upon the information.

13. An apparatus comprising:

one or more processors; and logic encoded in one or more non-transitory computer readable storage media for execution by the one or more processors and when executed operable to:

display one or more plan designing objects available to a user for creating a benefits plan design framework, with the one or more plan designing objects displayed in a palette portion of a graphical user interface;

place, in response to user input, selected plan designing objects in selected positions on a canvas portion of the graphical user interface to create the benefits plan design framework, with placement of plan designing objects determining a multi-level hierarchical relationship between plan designing objects moved to the canvas portion of the graphical user interface;

place, in response to user input, an eligibility object at one level of the multi-level hierarchical relationship, with the eligibility object defining attributes requirements of at least one benefits and with the attributes inherited by all plan designing objects at the same or lower levels in the multi-level hierarchical relationship;

populate one or more database tables stored in a repository in accordance with placement of plan designing objects on the canvas portion of the graphical user interface and in accordance with inherited attributes;

maintain and update a relationship table reflecting the relationship between the plan designing objects placed on the canvas portion of the graphical user interface; and prompt the user for information on attributes of plan designing objects populating the one or more database tables if more information for attributes of a plan designing object is needed; and performing validation on plan designing objects selected for the benefits plan design framework using a set of rules for plan designing objects.

14. The apparatus of claim 13, wherein the logic when executed is further operable to:

determine from plan designing object placement in a hierarchy whether the plan designing object inherits attributes from one or more related plan designing objects; and store data in the repository for the plan designing object to capture one or more inherited attributes for the plan designing object.

15. The apparatus of claim 13, wherein the logic when executed is further operable to:

determine from plan designing object placement in a hierarchy whether one or more related plan designing objects inherit attributes from the plan designing object; and store data in the repository for one or more inherited attributes for the one or more plan designing objects.

16. The apparatus of claim 13, wherein data stored in a repository for the benefits plan design framework is used for execution of a benefits plan software application.

17. The apparatus of claim 13, wherein user input comprises dragging and dropping an icon for an plan designing object from the palette portion to the canvas portion of the graphical user interface.

18. The apparatus of claim 13, wherein the logic when executed is further operable to:

receive information for the plan design framework previously saved for a user; and determine the one or more plan designing objects available for creating the plan design framework for the user based upon the information.

* * * * *